(12) United States Patent
Fukushima et al.

(10) Patent No.: US 11,012,028 B2
(45) Date of Patent: May 18, 2021

(54) REINFORCING MEMBER FOR SOLAR CELL MODULES, AND SOLAR CELL MODULE

(71) Applicant: Panasonic Intellectual Property Management Co., Ltd., Osaka (JP)

(72) Inventors: Atsushi Fukushima, Osaka (JP); Takahiro Nakamura, Osaka (JP); Toshiyuki Sakuma, Osaka (JP); Masashi Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/002,499

(22) Filed: Jun. 7, 2018

(65) Prior Publication Data

US 2018/0287551 A1    Oct. 4, 2018

Related U.S. Application Data

(63) Continuation of application No. PCT/JP2016/004561, filed on Oct. 13, 2016.

(30) Foreign Application Priority Data

Dec. 15, 2015   (JP) .............................. JP2015-243806

(51) Int. Cl.
   *H02S 30/10*   (2014.01)
(52) U.S. Cl.
   CPC ..................... *H02S 30/10* (2014.12)
(58) Field of Classification Search
   CPC ... Y02E 10/50–58; H02S 20/10; H02S 20/20; H02S 20/22–25; H02S 30/10
   USPC .................................................. 136/243–265
   See application file for complete search history.

(56) References Cited

U.S. PATENT DOCUMENTS

| | | | |
|---|---|---|---|
| 2011/0045234 A1* | 2/2011 | Miyamoto | B62D 25/105 428/119 |
| 2011/0232728 A1* | 9/2011 | Mun | H02S 30/10 136/251 |
| 2012/0279560 A1* | 11/2012 | Sumida | H01L 31/042 136/251 |

FOREIGN PATENT DOCUMENTS

| JP | 63-80867 U | 5/1988 |
|---|---|---|
| JP | 9-148612 A | 6/1997 |
| WO | 2011/090160 A1 | 7/2011 |

OTHER PUBLICATIONS

International Search Report dated Dec. 20, 2016, issued in counterpart International Application No. PCT/JP2016/004561 (1 page).

* cited by examiner

*Primary Examiner* — Eli S Mekhlin
*Assistant Examiner* — Dujuan A Horton
(74) *Attorney, Agent, or Firm* — Westerman, Hattori, Daniels & Adrian, LLP

(57) ABSTRACT

A reinforcing member according to an aspect of the present disclosure is a long member provided between a frame and a frame on the rear side of a solar cell module. The reinforcing member is provided with: a pair of leg parts respectively fixed to inner flanges and of the frames and; a pair of wall parts erected on the respective leg parts and arranged roughly vertical to the rear surface of a solar cell panel; and a top board part that connects upper ends of the wall parts and are arranged along the rear surface in a state of being close to or in contact with the rear surface of the solar cell panel.

12 Claims, 4 Drawing Sheets

REINFORCING MEMBER FOR SOLAR CELL MODULES, AND SOLAR CELL MODULE

INCORPORATION BY REFERENCE

The present application is a continuation under 35 U.S.C. § 120 of PCT/JP2016/004561, filed Oct. 13, 2016, which is incorporated herein by reference and which claimed priority to Japanese Patent Application No. 2015-243806 filed Dec. 15, 2015. The present application likewise claims priority under 35 U.S.C. § 119 to Japanese Patent Application No. 2015-243806 filed Dec. 15, 2015, the entire content of which is also incorporated herein by reference.

TECHNICAL FIELD

The present disclosure relates to a reinforcing member for solar cell module, and a solar cell module.

BACKGROUND

A solar cell module generally includes a solar cell panel and a module frame installed along an edge of the panel. The solar cell panel has a structure in which a plurality of solar cells are sandwiched between protective members such as glass plates. When load is applied from a light receiving surface side, warping sometimes occurs in the solar cell panel due to the load. Particularly, in a case where the thicknesses of the protective members are reduced in order to reduce the weight of the module, warping of the solar cell panel is easily generated. In view of such a situation, there is developed a solar cell module in which a reinforcing member is disposed on a rear side of the module to reinforce a solar cell panel (for example, refer to International Unexamined Patent Application Publication No. WO 2011/090160).

SUMMARY

There is a demand for the reinforcing member installed on the rear side of the solar cell module to be capable of supporting the solar cell panel from the rear side to sufficiently suppress warping of the panel, and to have a simple structure at a low manufacturing cost. Additionally, the reinforcing member is preferably lightweight. In a conventional reinforcing member, there is still room for improvement with respect to these demands.

A reinforcing member for solar cell module of an aspect of the present disclosure includes: a solar cell panel; a first frame installed along a first edge of the panel; and a second frame installed along a second edge facing the first edge, the reinforcing member being a long reinforcing member provided between the first frame and the second frame, on a rear side of a solar cell module formed with an inner flange projecting to inside of a module in a lower part of each of the frames, the reinforcing member including: a pair of leg parts fixed to the inner flange of each of the frames; a pair of wall parts erected on the respective leg parts, and disposed roughly vertical to a rear surface of the solar cell panel; and a top board part connecting respective upper ends of the wall parts, and disposed along the rear surface in a state of being close to or in contact with the rear surface of the solar cell panel.

A solar cell module of an aspect of the present disclosure includes a reinforcing member for solar cell module provided between a first frame and a second frame on a rear side of the module.

Advantageous Effect of Invention

A reinforcing member for solar cell module of an aspect of the present disclosure is capable of sufficiently suppressing warping of a solar cell panel while having a simple structure at a low manufacturing cost.

BRIEF DESCRIPTION OF DRAWINGS

The figures depict one or more implementations in accordance with the present teachings, by way of example only, not by way of limitations. In the figures, like reference numerals refer to the same or similar elements.

DESCRIPTION OF EMBODIMENTS

Figure 1A:
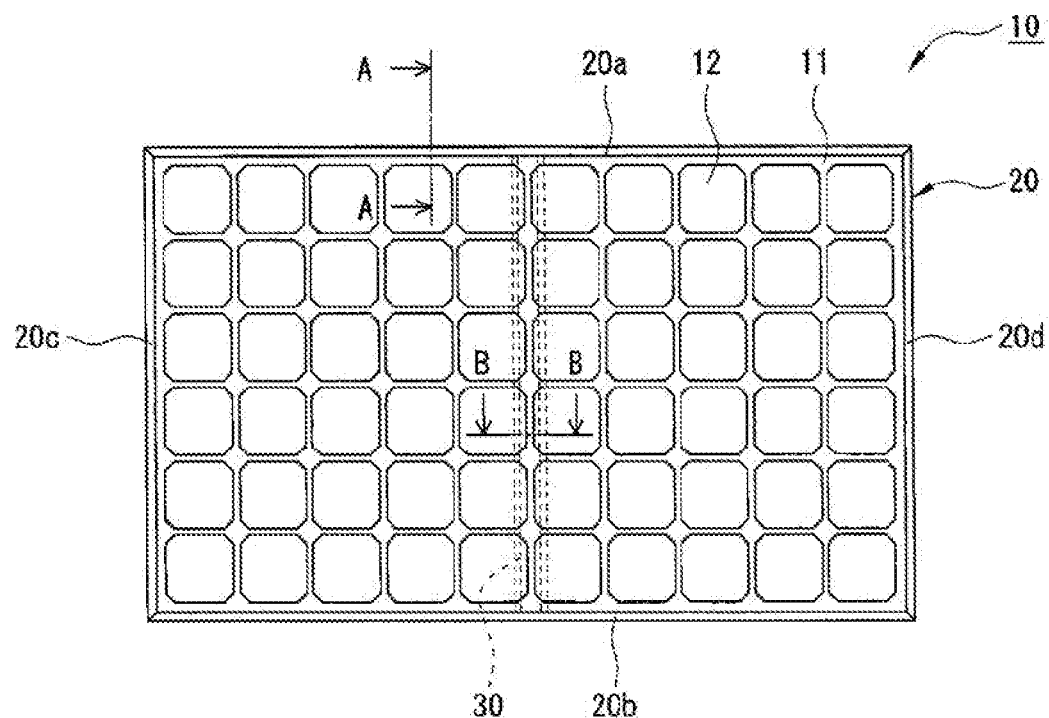
FIG. 1A is a diagram of a solar cell module of an example of an embodiment, viewed from a light receiving surface side.

A reinforcing member for solar cell module of an aspect of the present disclosure is capable of sufficiently suppressing warping of a solar cell panel while having a simple structure composed of a pair of leg parts, a pair of wall parts, and a top board part. The reinforcing member according to the present disclosure is capable of being manufactured, for example, by bending a single metal plate, and being manufactured at a lower cost than a conventional reinforcing member. Although details will be described below, the conventional reinforcing member generally has a roughly H-shaped cross section, and is manufactured by extrusion molding at a higher manufacturing cost than bending. Additionally, the reinforcing member according to the present disclosure has a structure that has a better load bearing capacity than the reinforcing member having the roughly H-shaped cross section. Therefore, it is possible to reduce the thickness of the reinforcing member and thereby reduce the weight of the reinforcing member.

Hereinafter, an example of an embodiment will be described in detail with reference to the attached drawings.

All of the drawings are schematically illustrated, and dimension ratios and the like of components illustrated in the drawings should be determined by taking the following description into consideration. In this specification, when "roughly vertical" is explained as an example, the use of "roughly—" means that not only "completely vertical" but also "substantially vertical" is included.

In this specification, the direction along the thickness direction of the solar cell panel is defined as the "vertical direction" of each of the components including a solar cell module, and the reinforcing member for solar cell module, and the light receiving surface side of the solar cell panel is defined as an "upper side". Plan view means a state where the solar cell panel and the like are viewed from the direction vertical to the light receiving surface of the panel. Herein, the light receiving surface of the solar cell panel is defined as a surface on which sunlight is mainly incident, and more than 50% to 100% of sunlight incident on the panel is incident from the light receiving surface.

Figure 1B:
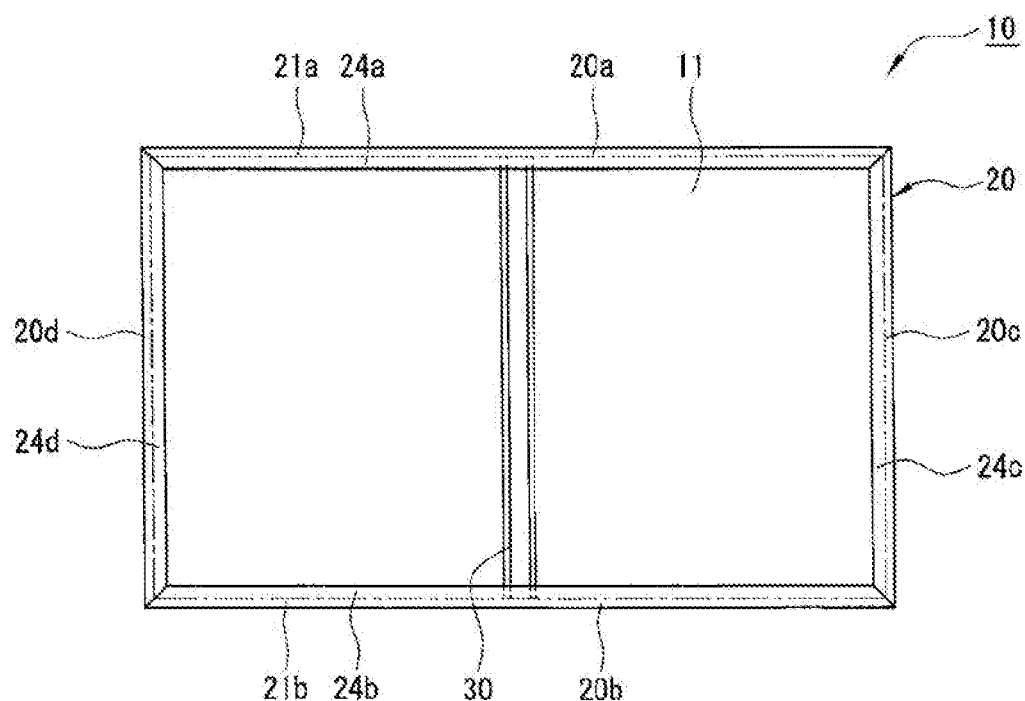
FIG. 1B is a diagram of the solar cell module of the example of the embodiment, viewed from a rear surface side.

FIGS. 1A and 1B each are a diagram illustrating a solar cell module 10 of an example of an embodiment. In FIG. 1B, boundary positions between a frame body and inner flanges are illustrated by dashed lines. As illustrated in FIGS. 1A and 1B, the solar cell module 10 includes a solar cell panel 11, and a module frame 20 installed along an edge of the panel. The solar cell panel 11 has, for example, a roughly rectangular shape in plan view, and has a structure in which a plurality of solar cells 12 are sandwiched between protective members such as glass plates. In this embodiment, an opaque back sheet is provided on the rear surface sides of the solar cells 12, and a solar cell panel 11 that does not allow the solar cells 12 to be seen from the rear surface side is exemplified. However, the solar cell panel 11 may be a double-sides light-receiving panel that allows the solar cells 12 to be seen from the rear surface side.

The module frame 20 protects an edge of the solar cell panel 11, and is used to mount the solar cell module 10 on an installation object (not illustrated) such as a base frame. The module frame 20 is preferably composed of a plurality of frames 20a, 20b, 20c, 20d installed along the edge of the solar cell panel 11. Each frame is connected to, for example, an adjacent frame by using by a corner piece and the like, and is installed so as to surround four sides of the solar cell panel 11. Each frame is a long member obtained by extrusion molding a metal material such as aluminum.

The module frame 20 has a frame 20a installed along a first long side (first edge) of the solar cell panel 11 having the roughly rectangular shape in plan view, and a frame 20b installed along a second long side (second edge) facing the first long side. In this embodiment, common members having the same shape and size are applied to the frames 20a, 20b. Inner flanges 24a, 24b projecting toward the inside of the module are formed on respective lower parts of the frames 20a, 20b. The inner flanges 24a, 24b extend from, for example, the respective lower parts of frame bodies 21a, 21b. In the example illustrated in FIG. 1B, inner flanges 24c, 24d are formed in frames 20c, 20d installed along short sides of the solar cell panel 11, respectively.

The solar cell module 10 includes a long reinforcing member 30 for solar cell module (hereinafter simply referred to as a "reinforcing member 30") provided between the frame 20a and the frame 20b, on the rear surface side of the module. The reinforcing member 30 is a crosspiece fixed to the frames 20a, 20b, and is preferably provided in a state of being in rough contact with a rear surface of the solar cell panel 11. The reinforcing member 30 supports the solar cell panel 11 from the rear side such that the solar cell panel 11 does not warp significantly due to load applied from the light receiving surface side of the solar cell panel 11, as described above.

In this embodiment, the single reinforcing member 30 is provided along the rear surface of the solar cell panel 11. A plurality of the reinforcing members 30 may be installed, but the number of the reinforcing members 30 is preferably one in view of reduction in weight, reduction in material cost, and the like. The reinforcing member 30 is provided from a longitudinal central part of the frame 20a to a longitudinal central part of the frame 20b. That is, the solar cell module 10 includes the single reinforcing member 30 passing through a central part in the long side direction of the solar cell panel 11, and provided along the short side direction. The reinforcing member 30 may be provided between the frame 20c and the frame 20d, and provided along the long side direction of the solar cell panel 11, for example, but is preferably provided along the short side direction of the panel in view of reduction in weight, reduction in material cost, and the like.

The reinforcing member 30 has a longitudinal first end disposed on the inner flange 24a of the frame 20a, and a longitudinal second end disposed on the inner flange 24b of the frame 20b. That is, the length of the reinforcing member 30 is shorter than an interval between the frame bodies 21a, 21b, and is longer than an interval between leading ends of the inner flanges 24a, 24b. The length of the reinforcing member 30 is preferably set to such a length as not to be in contact with the frame bodies 21a, 21b in view of mounting performance. The width of the reinforcing member 30 is not particularly limited, but is longer than the widths of the frame bodies 21a, 21b, and is shorter than a length equivalent to 5 times the width of each of the frame bodies 21a, 21b, for example. The reinforcing member 30 is preferably fixed to the inner flanges 24a, 24b by using bolts 40 (refer to FIG. 2).

Figure 2:
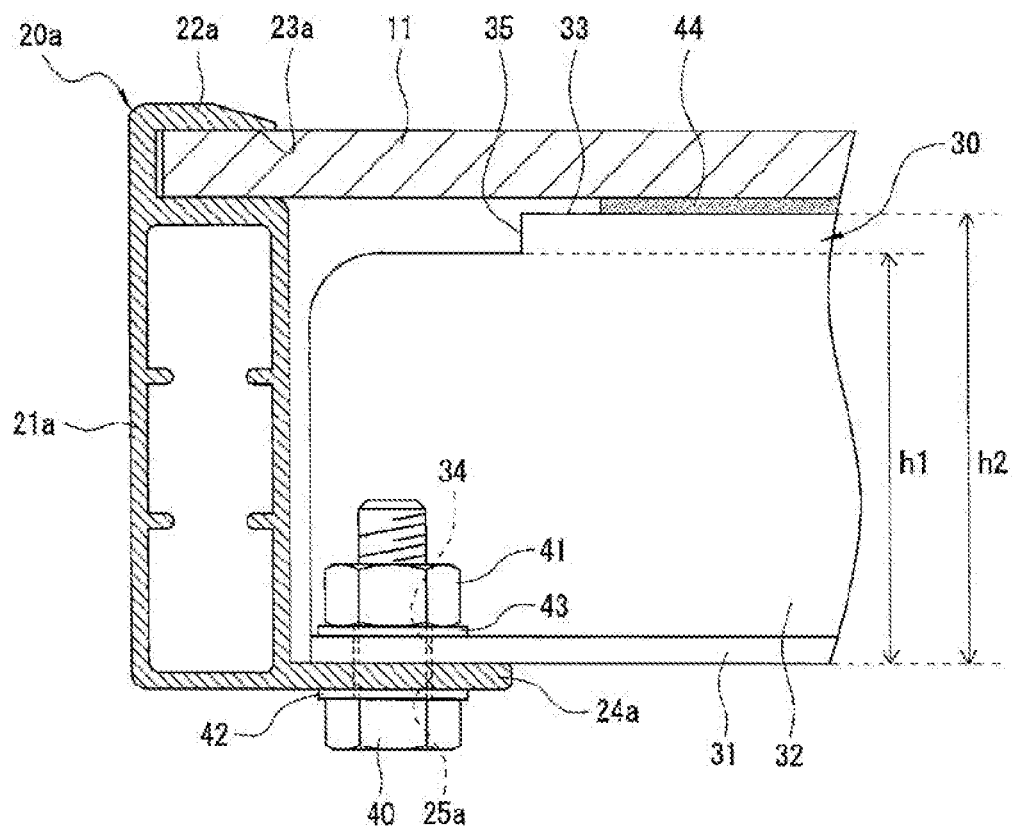
FIG. 2 is a sectional view taken along the AA line in FIG. 1.

FIG. 2 is a sectional view taken along the AA line in FIG. 1. As illustrated in FIG. 2, the frame 20a has a frame body 21a having a hollow prismatic shape, and a hook part 22a erected on the frame body 21a. As described above, the frame 20a has the inner flange 24a projecting to the inside of the module from the lower part of the frame body 21a. The frame body 21a has such a vertical length that it is possible to insert a longitudinal end of the reinforcing member 30 between the inner flange 24a and the rear surface of the solar cell panel 11. In other words, the vertical length of the reinforcing member 30 is set shorter than an interval between the inner flange 24a and the rear surface of the solar cell panel 11.

The hook part 22a extends upward from the outside of an upper surface of the frame body 21a, and bends to the inside of the module in the middle to be formed in a roughly L-shaped cross section. An inner groove 23a that is a clearance enabling the edge of the solar cell panel 11 to be inserted is formed between the frame body 21a and the hook part 22a. In the example illustrated in FIG. 2, the length of the hook part 22a along the width direction of the frame 20a is roughly the same as the width of the frame body 21a.

The inner flange 24a extends from a lower end of the frame body 21a, and is formed roughly vertical to an inner surface of the frame body 21a, for example. The inner flange 24a preferably extends roughly parallel to the rear surface of the solar cell panel 11. In this embodiment, the reinforcing member 30 is fixed to the inner flange 24a by using the bolts 40 as described above. Therefore, through holes 25a allowing the bolts 40 to be inserted are formed in the inner flange 24a. The two through holes 25a are formed corresponding to respective leg parts 31 of the reinforcing member 30.

Figure 3:
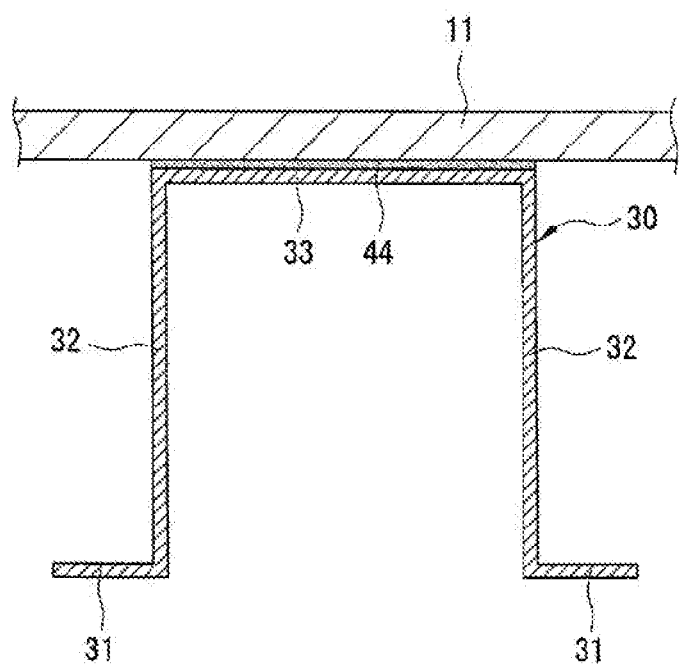
FIG. 3 is a sectional view taken along the BB line in FIG. 1.
Figure 4:
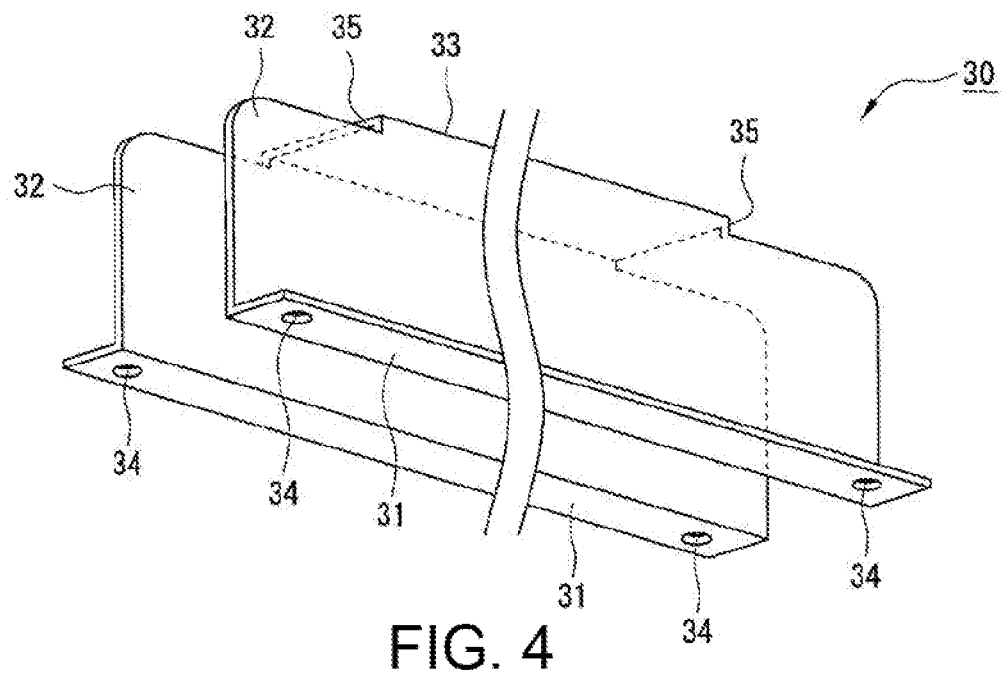
FIG. 4 is a perspective view of a reinforcing member for solar cell module of the example of the embodiment.

Hereinafter, the reinforcing member 30 will further be described in detail with reference to FIG. 3 and FIG. 4. FIG. 3 is a sectional view taken along the BB line in FIG. 1, and FIG. 4 is a perspective view of the reinforcing member 30. As illustrated in FIG. 2 to FIG. 4, the reinforcing member 30 includes a pair of the leg parts 31, a pair of wall parts 32 elected on the respective leg parts 31, and a top board part 33 connecting respective upper ends of the wall parts 32. As described above, the leg parts 31 are fixed to the inner flanges 24a, 24b of the frames 20a, 20b. The wall parts 32 are disposed roughly vertical to the rear surface of the solar cell panel 11, and the top board part 33 is disposed along the rear surface in a state of being close to or in contact with the rear surface of the solar cell panel 11. In a case where load is applied to the solar cell panel 11 from the light receiving surface side, that is, in a case where positive pressure is applied to the solar cell panel 1, the load is transmitted to the top board part 33 and the wall parts 32, and is supported by frames 20a, 20b fixed the leg parts 31.

The reinforcing member 30 is preferably composed of a single metal plate, and can be manufactured by bending the single metal plate. The reinforcing member 30 has a structure enabling manufacture by bending the single metal plate, and therefore can be manufactured at a lower cost than, for example, an extrusion molding method. Although details will be described below, cutouts 35 are preferably formed in both longitudinal ends of the reinforcing member 30 by cutting a part of the metal plate.

The leg parts 31 are preferably located at a lower end of the reinforcing member 30, and formed over the overall longitudinal length of the reinforcing member 30. The leg parts 31 are, for example, planar plate portions of a roughly rectangular shape in plan view, and are disposed roughly parallel to the rear surface of the solar cell panel 11. The leg parts 31 are provided on both sides in the width direction of the reinforcing member 30 along the longitudinal direction of the reinforcing member 30. In this embodiment, the two leg parts 31 extend in directions opposite to each other from respective lower ends of the wall parts 32. In this case, for example, durability to load that acts unevenly on one side in the width direction of the reinforcing member 30 is improved. The two leg parts 31 may have shapes and sizes that are different from each other, but are preferably roughly the same shape and size.

The respective leg parts 31 are preferably fixed to the inner flanges 24a, 24b of the frames 20a, 20b by using the bolts 40. Respective through holes 34 that allow the bolts 40 to be inserted are formed at such positions as to overlap on the inner flanges 24a, 24b, in both longitudinal ends of the leg parts 31. As illustrated in FIG. 2, the reinforcing member 30 is disposed on the inner flange 24a such that the through holes 34 of the leg parts 31 coincide with the through holes 25a of the inner flange 24a, for example. Nuts 41 are mounted on shaft sections of the bolts 40 inserted into the through holes 25a, 34, and the leg parts 31 are fixed to the inner flange 24a. The bolts 40 are preferably inserted into the through holes 25a, 34 from below the inner flange 24a, and the nuts 41 are preferably mounted on the inner flange 24a. Washers 42, 43 are generally provided between the bolts 40 and the inner flange 24a, and between the nuts 41 and the leg parts 31. Rivets may be used in place of the bolts 40, and the through holes 25a may be screw holes, and the nuts 41 may be eliminated.

The wall parts 32 are preferably formed roughly vertical to the leg parts 31, and the two wall parts 32 erected on the respective leg parts 31 are formed roughly parallel to each other. The wall parts 32 are disposed roughly vertical to the rear surface of the solar cell panel 11. A pair of the wall parts 32 connected by the top board part 33 are disposed roughly vertical to the rear surface of the solar cell panel 11 at an interval, so that it is possible to obtain high load bearing capacity, and significantly suppress warping of the solar cell panel 11.

The wall parts 32 preferably have roughly the same length as the leg parts 31 in order to improve the load bearing capacity of the reinforcing member 30. That is, the wall parts 32 are preferably formed over the longitudinal overall length of the reinforcing member 30. The wall parts 32 may be formed to have the same height over the longitudinal overall length, that is, the same vertical length, but are each preferably formed such that both longitudinal ends are lower than the longitudinal central part. Portions except the both longitudinal ends of the wall parts 32 are, for example, formed to have roughly the same height, and upper ends of the wall parts 32 are close to or in contact with the rear surface of the solar cell panel 11 in a state of fixing the respective leg parts 31 to the inner flanges 24a, 24b. The two wall parts 32 preferably have roughly the same shape and size.

As described above, in the wall parts 32, the heights of both longitudinal ends are preferably low. In this embodiment, the reinforcing member 30 is composed of the single metal plate, and the cutouts 35 are formed in both longitudinal ends of the reinforcing member 30. The top board part 33 is not formed in both longitudinal ends of the reinforcing member 30. That is, the reinforcing member 30 has a structure in which the leg parts 31 and the wall parts 32 extend from both longitudinal direction ends of the top board part 33 in the longitudinal direction. The height h1 of each longitudinal end of the wall parts 32 is 3% to 10% of the height h2 of the longitudinal central part, for example. In this case, it is possible to improve the mounting performance of the reinforcing member 30 while securing the load bearing capacity of the reinforcing member 30. Additionally, it is possible to further reduce the weight of the reinforcing member 30. A mounting method of the reinforcing member 30 will be described below.

Upper end corners located at both longitudinal ends of the wall parts 32 are preferably curved outward. That is, the upper end corers of the wall parts 32 are subjected to R chamfering to be rounded. In this case, for example, even when the upper end corners of the wall parts 32 come into contact with the rear surface of the solar cell panel 11 at the time of mounting of the reinforcing member 30, the panel is unlikely to be damaged.

The top board part 33 connects the upper ends of a pair of the wall parts 32, so that the reinforcing member 30 is integrated, and the load bearing capacity, the mounting performance, and the like of the reinforcing member 30 are improved. The reinforcing member 30 may be disposed at an interval between the top board part 33 and the rear surface of the panel in the vicinity of the rear surface of the solar cell panel 11, but is preferably disposed such that the top board part 33 is in rough contact with the rear surface of the panel. In the former case, when positive pressure is applied to the solar cell panel 11, and the panel is warped to a certain degree, the rear surface of the panel comes into contact with the top board part 33 to be supported, and further warping is prevented.

The top board part 33 is preferably formed in a portion except both longitudinal ends of the reinforcing member 30 in an upper end of the reinforcing member 30. That is, portions located at both longitudinal ends of the reinforcing member 30 are not connected to each other in a pair of the wall parts 32. The top board part 33 is, for example, a planar plate-like portion having a roughly rectangular shape in plan view, and is disposed roughly horizontal with respect to the rear surface of the solar cell panel 11, and is in contact with the rear surface of the panel.

The top board part 33 is preferably bonded to the rear surface of the solar cell panel 11 by a bonding material 44. The top board part 33 is bonded to the rear surface of the solar cell panel 11, so that in a case where load is applied from the rear side of the panel by air blowing, for example, that is, also in a case where negative pressure is applied to the solar cell panel 11, it is possible to suppress warping of the panel. The thickness of the bonding material 44 interposed between the rear surface of the solar cell panel 11 and an upper surface of the top board part 33 is, for example, about 10 μm to 1 mm.

For the bonding material 44, a general drying curable bonding agent, a two-pack curable bonding agent, a moisture curable bonding agent, and the like can be used. For example, these bonding agents may be applied on the top board part 33, and the top board part 33 may be joined to the rear surface of the solar cell panel 11, but the bonding material 44 is preferably a double sided tape having bonding agent layers formed on both surfaces of a tape base material in view of productivity improvement and the like. The double sided tape has, for example, drying curable bonding agent layers containing a surfactant.

Figure 5:
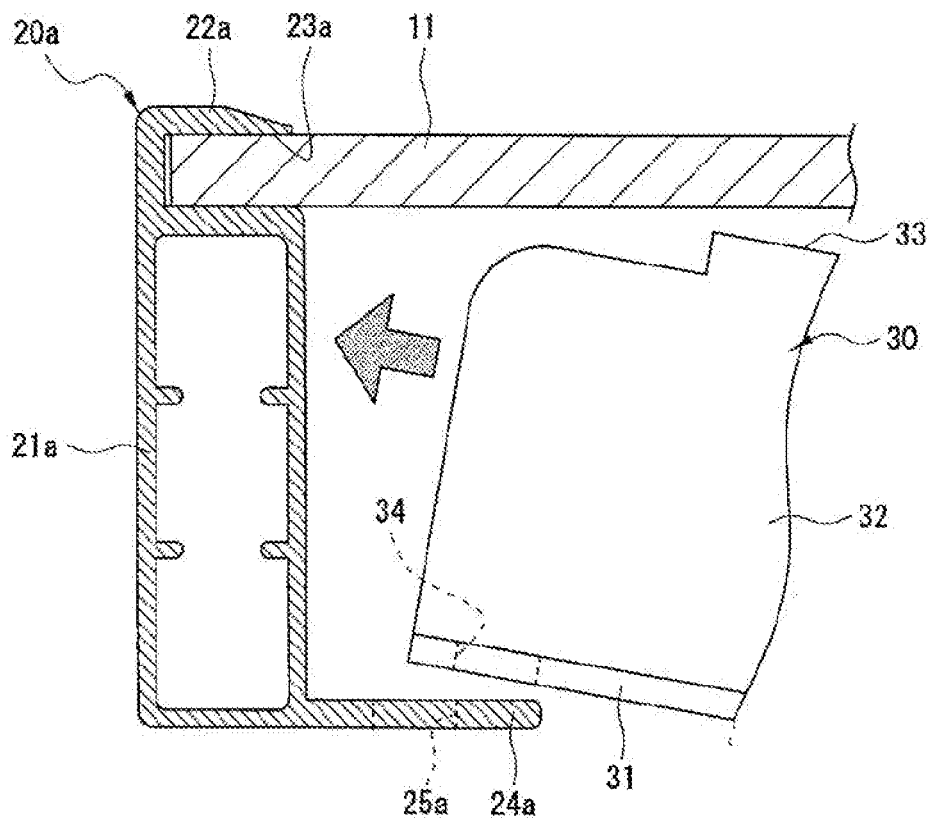
FIG. 5 is a diagram illustrating a state of mounting, on a module frame, the reinforcing member for solar cell module of the example of the embodiment.

FIG. 5 is a view illustrating a state of mounting the reinforcing member 30 on the rear side of the solar cell panel 11. As illustrated in FIG. 5, in the reinforcing member 30, both longitudinal ends are inserted between the inner flanges 24a, 24b and the rear surface of the solar cell panel 11. At this time, the bonding material 44, that is the double sided tape, is preferably adhered on the top board part 33. The reinforcing member 30 is fixed to the inner flanges 24a. 24b by the bolts 40 inserted into the through holes 34 of the leg parts 31.

As described above, in the wall parts 32, the heights of the both longitudinal ends are low, and therefore it is possible to mount the reinforcing member 30 without bringing the wall parts 32 into contact with the rear surface of the solar cell panel 11. Additionally, the upper end corners of the wall parts 32 are subjected to R chamfering, and therefore even when the upper end corners come into contact with the rear surface of the solar cell panel 11, it is possible to prevent damage of the panel. The reinforcing member 30 may be mounted in a state where the solar cell panel 11 is sucked from the light receiving surface side to be warped toward the light receiving surface side. Alternatively, after the reinforcing member 30 is joined to the rear surface of the solar cell panel 11, the module frame 20 can be installed on the panel.

Figure 6:
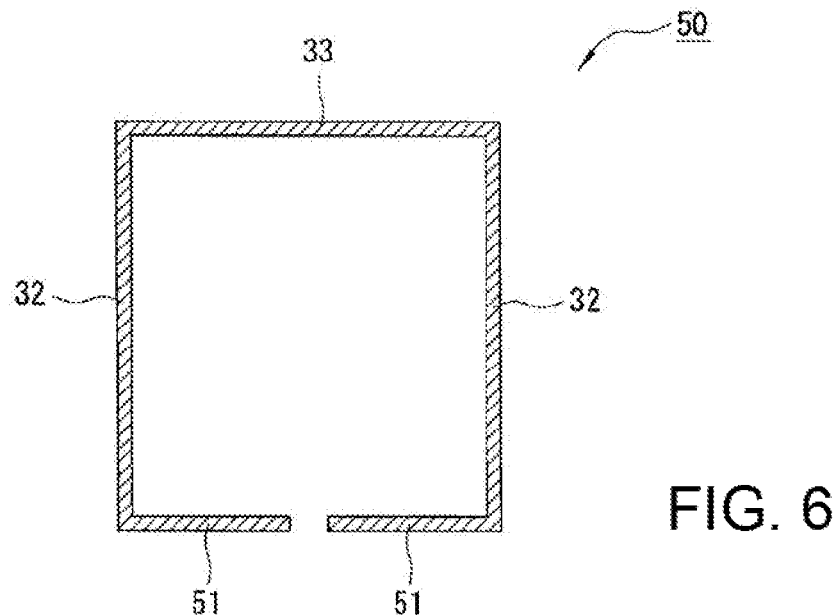
FIG. 6 is a sectional view of a reinforcing member for solar cell module of another example of the embodiment.

FIG. 6 is a sectional view illustrating a reinforcing member 50 of another example of the embodiment. As illustrated in FIG. 6, the reinforcing member 50 has something in common with the reinforcing member 30 in that a pair of leg parts 51, a pair of wall parts 32, and a top board part 33 are provided. On the other hand, the reinforcing member 50 is different from the reinforcing member 30 in that the two leg parts 51 extend in directions close to each other from the respective lower ends of the wall parts 32, that is, to the inside of the reinforcing member 50. In this case, the width of the reinforcing member 50 can be made smaller than the width of the reinforcing member 30. The leg parts 51 and the top board part 33 are provided side by side in the vertical direction, and the reinforcing member 50 has a roughly rectangular shaped cross section. Similarly to the leg parts 31, the leg parts 51 preferably have through holes that allow bolts for fixing the reinforcing member 50 on inner flanges of a frame to be inserted.

Figure 7:
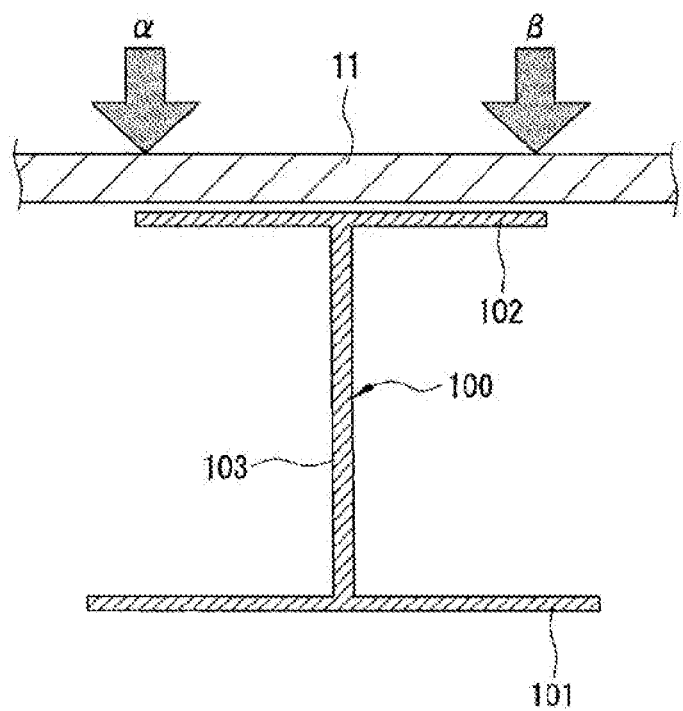
FIG. 7 is a sectional view of a conventional reinforcing member for solar cell module.

Working effects of the reinforcing member 30 having the above configuration will be described compared to a conventional reinforcing member 100 illustrated in FIG. 7. As illustrated in FIG. 7, the conventional reinforcing member 100 includes a bottom plate part 101, a top board part 102, and a wall part 103 connecting these parts, and has a roughly H-shaped cross section. The wall part 103 is formed roughly vertical to the bottom plate part 101 and the top board part 102, with a central part in the width direction of the bottom plate part 101 and a central part in the width direction of the top board part 102 being connected. In the reinforcing member 100 having such a structure, in a case where force such as load a or load 3 is applied from a light receiving surface side of a solar cell panel 11, it is assumed that the top board part 102 will easily deform, and warping of the solar cell panel 11 cannot be sufficiently suppressed. That is, the wall part 103 is provided in the central part in the width direction of the top board part 102, and therefore load applied to both ends in the width direction of the top board part 102 cannot be sufficiently supported. The same applies to negative pressure. When the thickness of the top board part 102 is increased, deformation of the top board part 102 is suppressed. However, in this case, there is a problem that the weight of the reinforcing member 100 is increased. The reinforcing member 100 cannot be manufactured by bending a metal plate, and is generally manufactured by extrusion molding.

On the other hand, even in a case where the force such as the load a or the load P is applied to the reinforcing member 30 from the light receiving surface side of the solar cell panel 11, deformation of the top board part 33 is prevented by a pair of the wall parts 32 supporting both ends in the width direction of the top board part 33. That is, deformation of the top board part 33 and the like is unlikely to occur in the reinforcing member 30, and the structure of the reinforcing member 30 has a better load bearing capacity than the reinforcing member 100. Therefore, it is possible to reduce the thickness of the reinforcing member 30 to reduce the weight of the solar cell module 10. Additionally, the reinforcing member 30 can be manufactured by bending a single metal plate, and can be manufactured at a lower cost than the reinforcing member 100 that is forced to be extrusion molded.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A reinforcing member for a solar cell module comprising:
   a solar cell panel;
   a first frame installed along a first edge of the panel; and
   a second frame installed along a second edge facing the first edge,
   the reinforcing member being a long member provided between the first frame and the second frame, on a rear side of a solar cell module formed with an inner flange projecting inside a module in a lower part of each of the frames, the reinforcing member comprising:
   a pair of leg parts fixed to the inner flange of each of the frames, said leg parts being formed in the lower end of the reinforcing member with said lower end having a longitudinal opening separating said leg parts;

a pair of wall parts erected on the respective leg parts, and disposed roughly vertical to a rear surface of the solar cell panel;

a top board part connecting respective upper ends of the wall parts, and disposed along the rear surface in a state of being close to or in contact with the rear surface of the solar cell panel;

each of the wall parts is formed such that both longitudinal ends are lower than a longitudinal central part;

each of the wall parts is formed such that both longitudinal ends are lower than a longitudinal central part by providing cutout portions of the wall parts at both longitudinal ends, wherein the cutouts are formed in each of the wall parts such that each of the wall parts has a different height in the longitudinal center part than in both the longitudinal ends, and said top board part connecting respective upper ends of the wall parts, with said top board part connecting the wall parts only in the longitudinal central parts of the wall parts and not in the longitudinal ends of the wall parts, whereby the reinforcing member is spaced apart from the solar panel at both longitudinal ends due to said the cutout portions.

2. The reinforcing member for solar cell module according to claim 1, wherein
respective upper end corners of the wall parts are curved outwards.

3. The reinforcing member for solar cell module according to claim 1, wherein
the respective leg parts extend in directions opposite to each other from respective lower ends of the wall parts.

4. A solar cell module comprising:
a solar cell panel;
a first frame installed along a first edge of the solar cell panel; and
a second frame installed along a second edge facing the first edge,
the solar cell module being formed with inner flanges projecting inside the module on respective lower parts of the frames, wherein
the reinforcing member for solar cell module according to claim 1 is provided between the first frame and the second frame on rear side of the module.

5. The solar cell module according to claim 4, wherein
the top board part is bonded to the rear surface of the solar cell panel through a bonding material.

6. A solar cell module comprising:
a solar cell panel;
a first frame installed along a first edge of the solar cell panel; and
a second frame installed along a second edge facing the first edge,
the solar cell module being formed with inner flanges projecting inside the module on respective lower parts of the frames, wherein
the reinforcing member for solar cell module according to claim 1 is provided between the first frame and the second frame on rear side of the module.

7. The solar cell module according to claim 6, wherein
the top board part is bonded to the rear surface of the solar cell panel through a bonding material.

8. A reinforcing member for solar cell module comprising:
a solar cell panel;
a first frame installed along a first edge of the panel; and
a second frame installed along a second edge facing the first edge,
the reinforcing member being a long member provided between the first frame and the second frame, on a rear side of a solar cell module formed with an inner flange projecting inside a module in a lower part of each of the frames, the reinforcing member comprising a substantially inverted U-shaped member having:
a pair of leg parts fixed to the inner flange of each of the frames, said leg parts being formed in the lower end of the reinforcing member with said lower end having a longitudinal opening separating said leg parts;
a pair of wall parts erected on the respective leg parts, and disposed roughly vertical to a rear surface of the solar cell panel;
wherein each of the wall parts is formed such that both longitudinal ends are lower than a longitudinal central part by providing cutout portions of the wall parts at both longitudinal ends, wherein the cutouts are formed in each of the wall parts such that each of the wall parts has a different height in the longitudinal center part than in both the longitudinal ends,
a top board part connecting respective upper ends of the wall parts, and disposed along the rear surface in a state of being close to or in contact with the rear surface of the solar cell panel;
wherein the top board part of the reinforcing member close to or in contact with the rear surface of the solar cell panel corresponds to a bottom of the U-shape and a portion of the reinforcing member opposite the bottom is open in between said pair of leg parts and said pair of wall parts;
wherein the reinforcing member is configured to be spaced apart from the solar panel at both longitudinal ends of the reinforcing member; and
the reinforcing member comprising a substantially inverted U-shaped member is a bent metal sheet.

9. The reinforcing member for solar cell module according to claim 8, wherein
each of the leg parts includes through holes at both longitudinal ends for connecting the reinforcing member to said first and second frames with bolts.

10. The reinforcing member for solar cell module according to claim 8, wherein
the respective leg parts extend in directions opposite to each other from respective lower ends of the wall parts.

11. The reinforcing member for solar cell module according to claim 8, wherein
the respective leg parts extend in directions towards each other from respective lower ends of the wall parts.

12. A method of making the reinforcing member for solar cell module according to claim 8, comprising: providing a metal sheet and bending the metal sheet into said inverted U-shape having said pair of leg parts, said pair of wall parts, and said top board part.

* * * * *